United States Patent
Yuan et al.

(10) Patent No.: US 12,541,134 B2
(45) Date of Patent: Feb. 3, 2026

(54) METHOD AND SYSTEM FOR OPTICAL SWITCHING WITH INTEGRATED POLARIZATION DIVERSITY CONTROL

(71) Applicant: II-VI Delaware, Inc., Wilmington, DE (US)

(72) Inventors: Haijun Yuan, Wilmington, DE (US); Bingyi He, Wilmington, DE (US); Helen Chen, Wilmington, DE (US); Haiji Yuan, Wilmington, DE (US); Qingyu Li, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 18/613,638

(22) Filed: Mar. 22, 2024

(65) Prior Publication Data

US 2025/0298286 A1 Sep. 25, 2025

(51) Int. Cl.
*G02F 1/31* (2006.01)

(52) U.S. Cl.
CPC ..................... *G02F 1/31* (2013.01)

(58) Field of Classification Search
CPC ........... G03H 2225/22; G03H 2225/60; G03H 2225/52; G03H 1/2294; G03H 2001/0224; G02F 2203/12; G02F 1/31
See application file for complete search history.

(56) References Cited

U.S. PATENT DOCUMENTS

| | | | | |
|---|---|---|---|---|
| 5,414,541 A | * | 5/1995 | Patel | ............ G02F 1/13471 349/196 |
| 2003/0194165 A1 | * | 10/2003 | Silberberg | ......... G02B 6/29367 385/11 |

* cited by examiner

*Primary Examiner* — Mariam Qureshi
(74) *Attorney, Agent, or Firm* — McAndrews, Held & Malloy, Ltd.

(57) ABSTRACT

A method and system for optical switching with integrated polarization diversity control comprising a beam displacer to receive an input beam and split the input beam into a first beam and a second beam with linear polarization. The first and second beams may be received on a liquid crystal cell that may rotate the first or second beam so that both beams have the same polarization after traversing the liquid crystal cell. Based on the polarization, the output beam may be switched to a port.

22 Claims, 4 Drawing Sheets

METHOD AND SYSTEM FOR OPTICAL SWITCHING WITH INTEGRATED POLARIZATION DIVERSITY CONTROL

TECHNICAL FIELD

The present disclosure generally relates a method and system for optical switching with integrated polarization diversity control.

BACKGROUND

Aspects of the present disclosure relate to a method and system for optical switching with integrated polarization diversity control. Various issues may exist with conventional solutions for optical switching with integrated polarization diversity control. In this regard, conventional systems and methods for optical switching with integrated polarization diversity control may be costly, cumbersome, and/or inefficient.

Limitations and disadvantages of conventional systems and methods will become apparent to one of skill in the art, through comparison of such approaches with some aspects of the present methods and systems set forth in the remainder of this disclosure with reference to the drawings.

BRIEF SUMMARY OF THE DISCLOSURE

Shown in and/or described in connection with at least one of the figures, and set forth more completely in the claims are waveguides and methods of forming such waveguides.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DESCRIPTION

Figure 1:
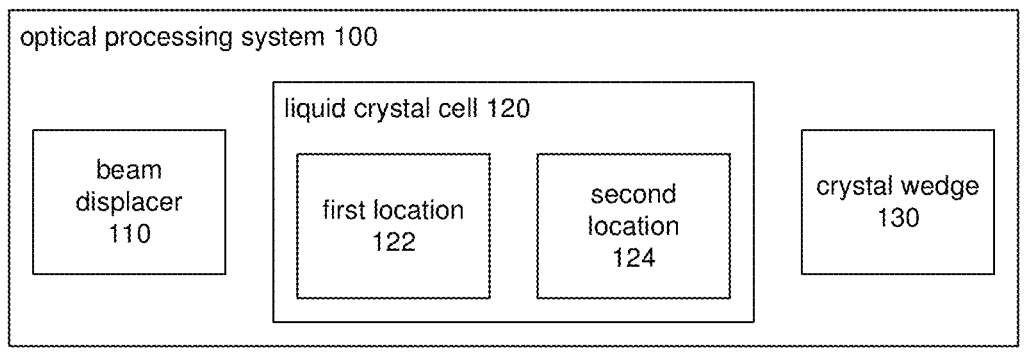
FIG. 1 is a block diagram illustrating an optical processing system, according to some embodiments of the present disclosure.

The following discussion provides various examples of optical devices and methods. Such examples are non-limiting, and the scope of the appended claims should not be limited to the particular examples disclosed. In the following discussion, the terms "example" and "e.g.," are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set {(x), (y), (x, y)}. As another example, "x, y, or z" means any element of the seven-element set {(x), (y), (z), (x, y), (x, z), (y, z), (x, y, z)}.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Embodiments of the present disclosure may comprise an optical processing system, the system comprising a beam displacer, operable to receive an input beam and split the input beam into a first beam and a second beam with linear polarization. Embodiments may also comprise a liquid crystal (LC) cell comprising a first location and a second location, operable to receive the first beam in the first location and the second beam in a second location.

In accordance with various embodiments, the liquid crystal cell is operable to rotate the first beam into a first LC-output beam or the second beam into a second LC-output beam. In accordance with various embodiments, the first LC-output beam and the second LC-output beam may be of a same polarization after traversing the liquid crystal cell. Embodiments may also comprise a crystal wedge, operable to receive the first LC-output beam and the second LC-output beam and direct both in a spatial output direction, the spatial output direction based on the same polarization of the first LC-output beam and the second LC-output beam.

In accordance with various embodiments, the beam displacer may comprise a birefringent crystal. In accordance with various embodiments, the birefringent crystal may be a calcite or yttrium orthovanadate crystal. In accordance with various embodiments, the input beam may comprise a portion of light linearly polarized in a first direction and a second portion of light linearly polarized in a second direction, the second direction may be orthogonal to the first direction.

In accordance with various embodiments, the first beam and the second beam may be polarized differently. In accordance with various embodiments, the first beam and the second beam may be polarized orthogonally to each other. In accordance with various embodiments, the liquid crystal cell may comprise a pixel each in the first location and the second location.

In accordance with various embodiments, each of the pixels may be controlled independently. Embodiments may also comprise each of the pixels being operable to rotate an input beam based on the independent controlling.

In accordance with various embodiments, the liquid crystal cell may comprise the first location and the second location in a single pixel, e.g., V1. In accordance with various embodiments, the first location can be controlled independently from the second location. In accordance with various embodiments, the liquid crystal cell may comprise an array of such single pixels operable to support a plurality of the optical processing system and method. In accordance with various embodiments, each of the single pixels may comprise a first location and a second location. In accordance with various embodiments, the plurality of first locations can be commonly controlled and the plurality of second locations can be commonly controlled, through interleaved pattern electrodes.

In accordance with various embodiments, the common control may be implemented by using an interleaved pattern on a bottom electrode across the single pixels. In accordance with various embodiments, the spatial output direction may be operable to couple both the first LC-output beam and the second LC-output beam to either a first optical output port or a second optical output port, based on the same polarization of the first LC-output beam and the second LC-output beam.

Embodiments of the present disclosure may also comprise an optical processing method, the method comprising splitting a received input beam into a first beam and a second beam, with a linear polarization of at least a portion of the input beam. Embodiments may also comprise receiving the first beam in a first location and the second beam in a second location.

Embodiments may also comprise rotating the first beam into a first LC-output beam or the second beam into a second LC-output beam. In accordance with various embodiments, the first LC-output beam and the second LC-output beam may be of a same polarization. Embodiments may also comprise directing both the first LC-output beam and the second LC-output beam in a spatial output direction, the spatial output direction based on the same polarization of the first LC-output beam and the second LC-output beam.

In accordance with various embodiments, the method may comprise splitting the input beam in a birefringent crystal that acts as a beam displacer. In accordance with various embodiments, the birefringent crystal may be a calcite or yttrium orthovanadate crystal. In accordance with various embodiments, the input beam may comprise a portion of light linearly polarized in a first direction and a second portion of light linearly polarized in a second direction, the second direction being orthogonal to the first direction.

In accordance with various embodiments, the first beam and the second beam may be polarized differently. In accordance with various embodiments, the first beam and the second beam may be polarized orthogonally to each other. In accordance with various embodiments, the rotating of the first beam or the second beam may be achieved in a liquid crystal cell comprising a pixel each in the first location and the second location.

Embodiments may also comprise pixels that can be independently controlled. Embodiments may also comprise pixels that may each be operable to rotate an input beam based on the independent controlling.

In accordance with various embodiments, the first location and the second location may be located on a single pixel of a liquid crystal cell. In accordance with various embodiments, the method may comprise controlling the first location independently from the second location. In accordance with various embodiments, the liquid crystal cell may comprise an array of the single pixels operable to support a plurality of the optical processing methods.

Embodiments may also comprise a single pixel that each may comprise a first location and a second location, comprising commonly controlling the plurality of first locations and the plurality of second locations. In accordance with various embodiments, the common controlling may be implemented by using an interleaved pattern on a bottom electrode across the single pixels. In accordance with various embodiments, the method may comprise coupling both the first LC-output beam and the second LC-output beam to either a first optical output port or a second optical output port, based on the same polarization of the first LC-output beam and the second LC-output beam.

Referring now to FIG. 1, FIG. 1 is a block diagram that describes an optical processing system 100, according to some embodiments of the present disclosure. In some embodiments, the optical processing system 100 may include a liquid crystal cell 120. The optical processing system 100 may also include a beam displacer 110, operable to receive an input beam and split the input beam into a first beam and a second beam, based on a linear orthogonal polarization. The optical processing system 100 may also include a crystal wedge 130, operable to receive the first LC-output beam and the second LC-output beam and direct both in a spatial output direction, the spatial output direction may be based on the same polarization of the first LC-output beam and the second LC-output beam.

In some embodiments, the liquid crystal cell 120 may include a first location 122 operable to receive the first beam. The liquid crystal cell 120 may also include a second location 124, operable to receive the second beam. The liquid crystal cell 120 may be operable to rotate the first beam into a first LC-output beam or the second beam into a second LC-output beam. The first LC-output beam and the second LC-output beam may be of a same polarization after traversing the liquid crystal cell 120.

In some embodiments, the beam displacer 110 may include a birefringent crystal. In some embodiments, the birefringent crystal may be a calcite or yttrium orthovanadate crystal. In some embodiments, the input beam may also include a portion of light linearly polarized in a first direction and a second portion of light linearly polarized in a second direction, the second direction being orthogonal to the first direction.

In some embodiments, the first beam and the second beam may be polarized differently. In some embodiments, the first beam and the second beam may be polarized orthogonal to each other. In some embodiments, the liquid crystal cell 120 may include a pixel each in the first location 122 and the second location 124. In some embodiments, each of the pixels can be controlled independently. In some embodiments, each of the pixels may be operable to rotate an input beam based on the independent controlling.

In some embodiments, the first location 122 can be controlled independently from the second location 124. In some embodiments, the spatial output direction may be operable to couple both the first LC-output beam and the second LC-output beam to either a first optical output port or a second optical output port, based on the same polarization of the first LC-output beam and the second LC-output beam.

Figure 2A:
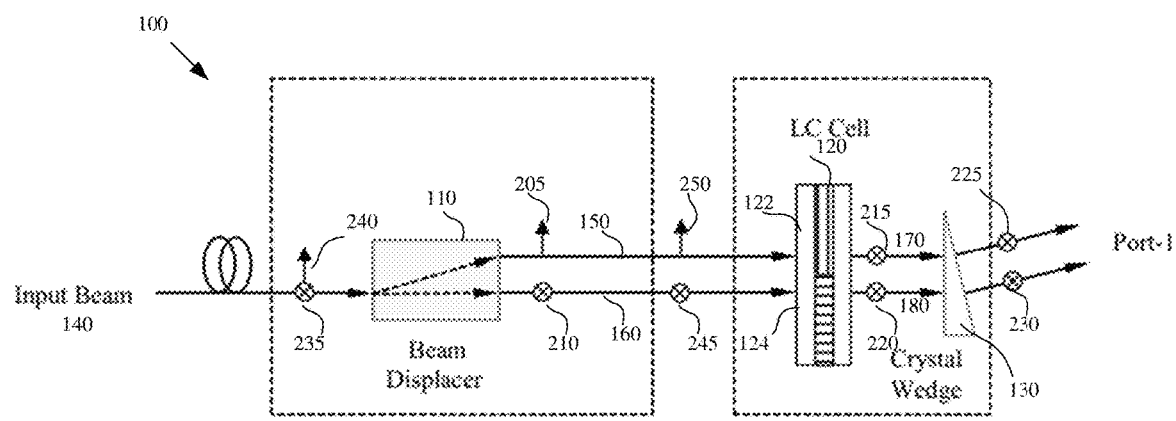
FIG. 2A is a diagram further illustrating the optical processing system from FIG. 1, according to some embodiments of the present disclosure.

FIG. 2A is a diagram further illustrating the optical processing system from FIG. 1, according to some embodiments of the present disclosure. Identical reference numbers as in previous figures refer to similar or substantially same elements.

A beam displacer 110 may receive an input beam 140. The polarization of input beam 140 may comprise a signal light portion of linear polarization perpendicular to the drawing plane, symbolized by an encircled "x," referred to as "X polarization," and a signal light portion of linear polarization parallel to the drawing plane, symbolized by an arrow pointing to the top of the page, referred to as "arrow polarization." X polarization may be indicated by numerals 235, 210, 245, 220, 215, 225, and 230. Arrow polarization may be indicated by numerals 240, 205, and 250.

The beam displacer 110 may be operable to split the signal with different polarizations comprised in the input beam 140 into a first beam 150 and a second beam 160. The first beam 150 may comprise a portion of the input beam 140 that may be arrow polarized. The second beam 160 may comprise a portion of the input beam 140 that may be x polarized. Correspondingly, the polarization of the first beam 150 may be different from the polarization of the second beam 160, as indicated by polarization 205, 210, for example linear and orthogonal.

The first beam 150 may be coupled from the beam displacer 110 to a first location 122 on liquid crystal cell 120. Similarly, the second beam 160 may be coupled from the beam displacer 110 to a second location 124 on the liquid crystal cell 120. The liquid crystal cell 120 may be operable to provide a plurality of controllable locations. For example, a first location 122 illustrated with vertical hash, may refer to liquid crystals being exposed to a low control voltage. A low control voltage applied to a first location 122 may rotate an input signal beam to the first location 122 on traversing the liquid crystal cell 120. Correspondingly, as illustrated by the arrow polarization 250 of the first beam 150 on entering a first location 122, the first LC-output beam 170 from location 122 has been rotated from arrow polarization 250 to X polarization 215.

Similarly, a second location 124 illustrated with horizontal hash, may refer to liquid crystals being exposed to a high control voltage. A high control voltage applied to a second location 124 may allow an input signal to the first location 124 to pass without being rotated on traversing the liquid crystal cell 120. Correspondingly, as illustrated by the X polarization 245 of the second beam 160 entering the second location 124, the second LC-output beam 180 from location 124 has not been rotated from X polarization 245, 220.

In accordance with various embodiments, the LC cell 120 may comprise a pixel in a first location 122 and/or in a second location 124. Alternatively, the LC cell 120 may comprise a single pixel comprising a first location 122 and a second location 124 that may be controllable individually. Correspondingly, there may be an arbitrary number of locations on a single pixel. In accordance with some embodiments, there may also be an arbitrary number of pixels.

A first location 122 and a second location 124 may each be controlled with both a low and a high voltage, resulting in an input beam being rotated or not, respectively.

As illustrated in FIG. 2A, the first LC output 170 and the second LC output 180 may be polarized in the same direction, illustrated by X polarization 215, 220. The first LC output 170 and the second LC output 180 may be coupled to a crystal wedge 130. The crystal wedge 130 may be operable to direct input light in a spatial direction that is dependent on the polarization of the input light. In FIG. 2A, the first LC output 170 and the second LC output 180 may be directed toward Port-1, as illustrated, because of their X polarization 215, 220, 225, 230.

Figure 2B:
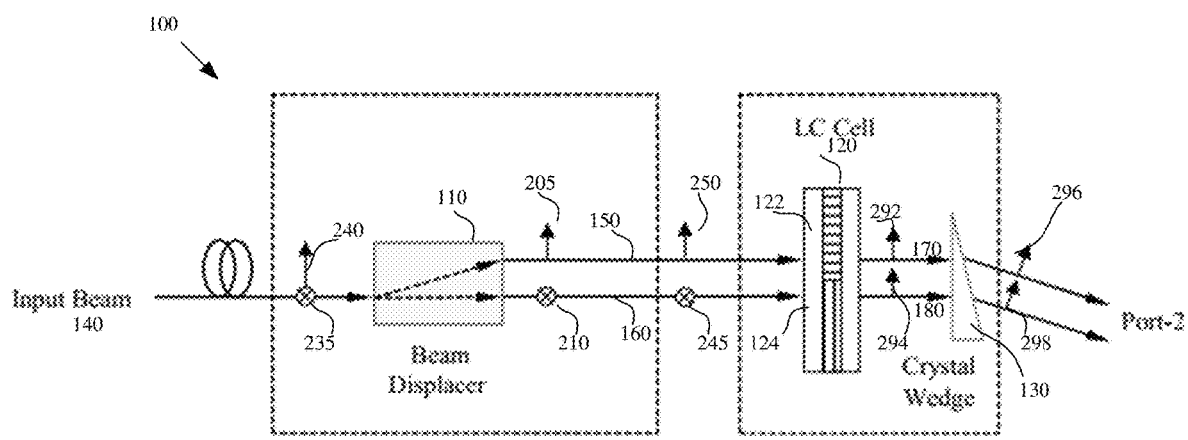
FIG. 2B further illustrates FIG. 2A when switching in a different spatial output direction, according to some embodiments of the present disclosure.

FIG. 2B further illustrates FIG. 2A when switching in a different spatial output direction. FIG. 2B is substantially similar to FIG. 2A. However, the first location 122 may be controlled with a high-voltage, illustrated by the horizontal hash. Similarly, the second location 124 may be controlled with a low-voltage, illustrated by the vertical hash. Correspondingly, the LC cell 120 at first location 122 does not rotate the input first beam 150. The LC cell 120 at second location 124 may rotate the input second beam 160 to change its X polarization 245 to arrow polarization 294. The first LC output 170 and the second LC output 180 may both be arrow polarized in this example. Because the polarization of the first LC output 170 and the second LC output 180 may be different from FIG. 2A, the crystal wedge 130 may direct the LC output beam 170 and the LC output beam 182 toward Port-2, i.e., in different spatial output direction.

Figure 2C:
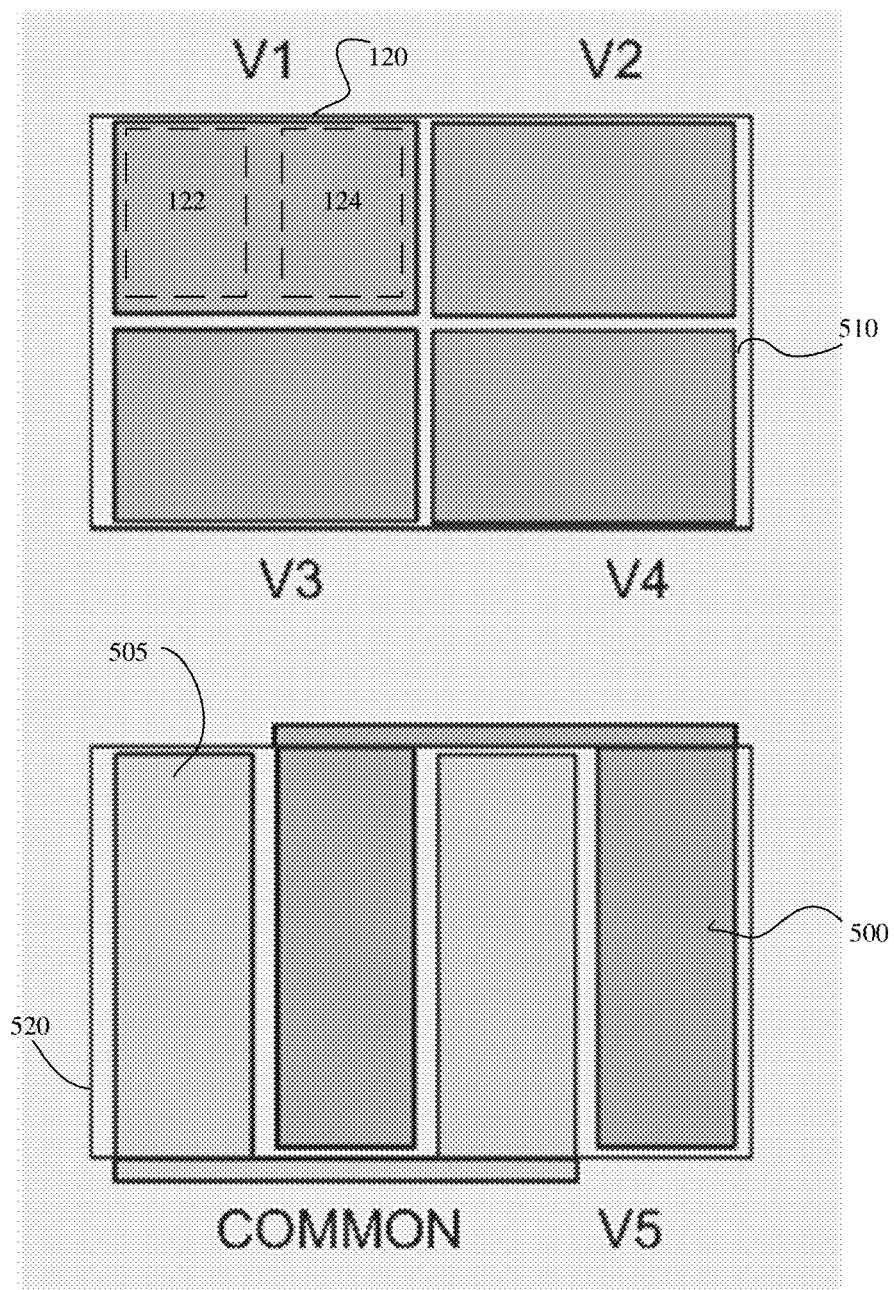
FIG. 2C illustrates an exemplary electrode arrangement of array of LC cells/pixels in accordance with various embodiments of the present disclosure.

FIG. 2C illustrates an exemplary array of LC cells/pixels in accordance with various embodiments of the present disclosure.

There is shown an array of four LC cells/pixels V1-V4 on a top electrode 510. There is further shown a bottom electrode 520. V1 may depict exemplary LC cell 120 comprising a first location 122 and a second location 124, illustrated with dashed lines. In accordance with various embodiments of the present disclosure, V1-V4 may depict single pixel LC cells. The first location 122 and the second location 124 of LC cell 120 may be controlled individually by applying different voltage levels on the first interleaved pattern electrode 500 and a second interleaved pattern electrode 505 on the bottom electrode 520. By applying different voltages under the first location 122 and the second location 124, the corresponding areas of a single pixel V1 of LC cell 120 may be controlled separately, allowing for the rotation (or not) of input light as it may traverse the LC cell 120 and/or the pixel V1 at first location 122 or first location 124, respectively. Using the interleaved patterns electrodes 500, 505, each LC cell/pixel may be supplied with two different voltages, thus generating two areas similar to a first location 122 and a second location 124 on each pixel V1-V4. Correspondingly, each pixel V1-V4 may be enabled to rotate an input light its surface area associated with an applied low voltage.

Figure 3:
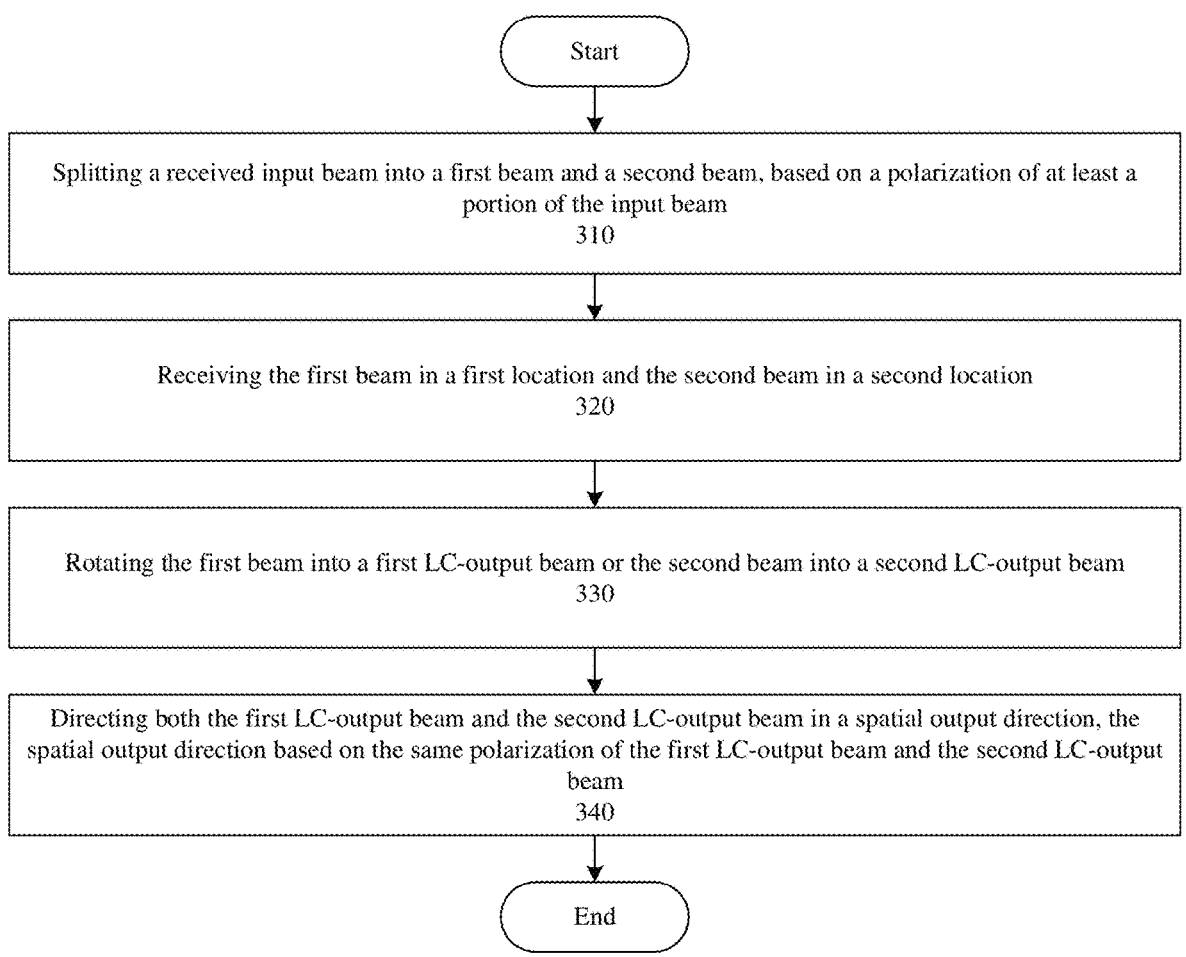
FIG. 3 is a flowchart illustrating an optical processing method, according to some embodiments of the present disclosure.

FIG. 3 is a flowchart that describes an optical processing method, according to some embodiments of the present disclosure. In some embodiments, at 310, the optical processing method may include splitting a received input beam 140 into a first beam 150 and a second beam 160, based on a linear orthogonal polarization of at least a portion of the input beam 140. At 320, the optical processing method may include receiving the first beam 150 in a first location 122 and the second beam 160 in a second location 124. At 330, the optical processing method may include rotating the first beam 150 into a first LC-output beam 170 or the second beam 160 into a second LC-output beam 180. At 340, the optical processing method may include directing both the first LC-output beam 170 and the second LC-output beam 180 in a spatial output direction, the spatial output direction based on the same polarization of the first LC-output beam 215, 292 and the second LC-output beam 220, 294. The first LC-output beam 170 and the second LC-output beam 180 may be of a same polarization.

In some embodiments, the method may include splitting the input beam 140 in a birefringent crystal that acts as a beam displacer 110. In some embodiments, the birefringent crystal may be a calcite or yttrium vanadate crystal. In some embodiments, the input beam 140 may comprise a portion of light linearly polarized in a first direction 205 and a second portion of light linearly polarized in a second direction 210, the second direction 210 being orthogonal to the first direction 205.

In some embodiments, the first beam 150 and the second beam 160 may be polarized differently, polarization 250, 245, for example linear orthogonal. In some embodiments, the first beam 150 and the second beam 160 may be polarized orthogonal to each other, for example as X polarization and arrow polarization. In some embodiments, the rotating of the first beam 150 or the second beam 160 may be achieved in a liquid crystal cell 120 comprising a pixel each in the first location 122 and the second location 124. In some embodiments, each of the pixel can be independently controlled.

In some embodiments, each of the pixel may be operable to rotate an input beam 150, 160 based on the independent controlling. In some embodiments, the first location 122 and the second location 124 may be located on a single pixel of a liquid crystal cell 120, see also FIG. 2C. In some embodiments, the method may include controlling the first location 122 independently from the second location 124. In some embodiments, the liquid crystal cell 120 may comprise an array of the single pixels V1-V4 operable to support a plurality of the optical processing methods.

In some embodiments, each of the single pixels V1-V4 may comprise a first location 122 and a second location 124, comprising commonly controlling the plurality of first locations 122 and the plurality of second locations 124. In some embodiments, the common controlling may be implemented by using an interleaved pattern 500, 505 on a bottom electrode 520 across a single pixel V1-V4. In some embodiments, the method may include coupling both the first LC-output beam 170 and the second LC-output beam 180 to either a first optical output port (Port-1) or a second optical output port (Port-2), based on the same polarization, e.g., 292, 294, of the first LC-output beam 170 and the second LC-output beam 180.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. An optical processing system, said system comprising:
   a beam displacer, operable to receive an input beam and split said input beam into a first beam and a second beam with orthogonal linear polarization;
   a liquid crystal cell comprising a first location and a second location, operable to:
      receive said first beam in said first location and said second beam in said second location; and
      rotate said first beam into a first LC-output beam or said second beam into a second LC-output beam, wherein said first LC-output beam and said second LC-output beam are of a same polarization after traversing said liquid crystal cell; and
   a crystal wedge, operable to receive said first LC-output beam and said second LC-output beam and direct both in a spatial output direction, said spatial output direction being based on said same polarization of said first LC-output beam and said second LC-output beam, wherein:
      said liquid crystal cell comprises said first location and said second location in a single pixel,
      said liquid crystal cell comprises an array of said single pixels operable to support a plurality of said optical processing systems,
      each of said single pixels comprises a first location and a second location,
      a plurality of first locations can be commonly controlled and a plurality of second locations can be commonly controlled, and
      a common control is implemented by using an interleaved pattern on a bottom electrode across said single pixels.

2. The system of claim 1, wherein said beam displacer comprises a birefringent crystal.

3. The system of claim 2, wherein said birefringent crystal is a calcite or yttrium orthovanadate crystal.

4. The system of claim 1, wherein said input beam comprises a portion of light linearly polarized in a first direction and a second portion of light linearly polarized in a second direction, said second direction being orthogonal to said first direction.

5. The system of claim 1, wherein said first beam and said second beam are polarized differently.

6. The system of claim 1, wherein said first beam and said second beam are polarized orthogonal to each other.

7. The system of claim 1, wherein said liquid crystal cell comprises a pixel each in said first location and said second location.

8. The system of claim 7, wherein each of said pixel can be independently controlled.

9. The system of claim 8, wherein each of said pixel is operable to rotate an input beam based on said independent controlling.

10. The system of claim 1, wherein said first location can be controlled independently from said second location.

11. The system of claim 1, wherein said spatial output direction is operable to couple both said first LC-output beam and said second LC-output beam to either a first optical output port or a second optical output port, based on said same polarization of said first LC-output beam and said second LC-output beam.

12. An optical processing method, said method comprising:
   splitting a received input beam into a first beam and a second beam with orthogonal linear polarization;
   receiving said first beam in a first location and said second beam in a second location;
   rotating said first beam into a first LC-output beam or said second beam into a second LC-output beam, wherein said first LC-output beam and said second LC-output beam are of a same polarization;
   directing both said first LC-output beam and said second LC-output beam in a spatial output direction, said spatial output direction based on said same polarization of said first LC-output beam and said second LC-output beam, wherein:

said first location and said second location are located on a single pixel of a liquid crystal cell, said liquid crystal cell comprises an array of said single pixels operable to support a plurality of said optical processing methods, and each of said single pixels comprises a first location and a second location; and commonly controlling a plurality of first locations and a plurality of second locations, wherein said commonly controlling is implemented by using an interleaved pattern on a bottom electrode across said single pixels.

13. The method of claim 12, comprising splitting said input beam in a birefringent crystal that acts as a beam displacer.

14. The method of claim 13, wherein said birefringent crystal is a calcite or yttrium orthovanadate crystal.

15. The method of claim 12, wherein said input beam comprises a portion of light linearly polarized in a first direction and a second portion of light linearly polarized in a second direction, said second direction being orthogonal to said first direction.

16. The method of claim 12, wherein said first beam and said second beam are polarized differently.

17. The method of claim 12, wherein said first beam and said second beam are polarized orthogonal to each other.

18. The method of claim 12, wherein said rotating of said first beam or said second beam is achieved in a liquid crystal cell comprising a pixel each in said first location and said second location.

19. The method of claim 18, wherein each of said pixel can be independently controlled.

20. The method of claim 19, wherein each of said pixel is operable to rotate an input beam based on said independent controlling.

21. The method of claim 12, comprising controlling said first location independently from said second location.

22. The method of claim 12, comprising coupling both said first LC-output beam and said second LC-output beam to either a first optical output port or a second optical output port, based on said same polarization of said first LC-output beam and said second LC-output beam.

* * * * *